INVENTORS.
SEYMOUR NAPOLIN
MARK H. HARWOOD

ATTORNEY

United States Patent Office 2,985,028
Patented May 23, 1961

2,985,028

DRIVING MECHANISMS FOR ELECTRONIC DEVICES

Seymour Napolin, Westbury, and Mark H. Harwood, Syosset, N.Y., assignors to Granco Products, Inc., Long Island City, N.Y., a corporation of New York Filed Dec. 18, 1959, Ser. No. 860,481

16 Claims. (Cl. 74—409)

This invention relates to driving mechanisms for the adjustment of electronic devices especially tuning devices.

One of the objects of the invention is to provide a driving gear assembly of extremely simple construction and adapted to be operative positively even after considerable wear and tear, and substantially without any further adjustment.

A more specific object of the invention is to provide a gear assembly including at least a pair of wheels arranged to engage each other, and including at least one wheel provided with at least one peripheral slot arranged near its periphery and along the point of engagement to permit the slotted gear to be mounted on points engaging another gear under flexible pressure.

Another object of the invention is to provide at least one in a number of tooth meshing gears with a slot or slots extending peripherally along its tooth base so as to permit that gear when mounted to mesh with another gear to engage that other gear under flexible pressure.

A further object of the invention is to facilitate mounting of the small or manual wheel by means of a detachable driving knob enhancing positive engagement.

Still another object of the invention is to provide at least one of the gears with a slot extending near and along its periphery over at least 180° of its periphery and separated by radial ribs so as to permit that gear when assembled pressed against another gear to give away and to increase contact pressure when driven through 180° of said periphery.

An additional object of the invention is to provide at least one of the gears, and especially the smaller one of the gears, with teeth which are axially staggered; each of the staggered gears being substantially smaller in width than the width of the larger gear meshing with the smaller gear.

A further object of the invention is to combine in a driving mechanism for electronic tuning devices a larger tooth gear which is manually driven and is provided along the base of its teeth, preferably along a peripheral section of that base extending over approximately 180°, with an elongated slot or slots permitting said gear slightly to give way in radial direction when mounted to mesh with a smaller gear; and wherein the smaller tooth gear is provided with teeth having a width substantially smaller than the width of the larger gear, but so staggered as to engage together the larger gear over its entire width.

Figure 1:
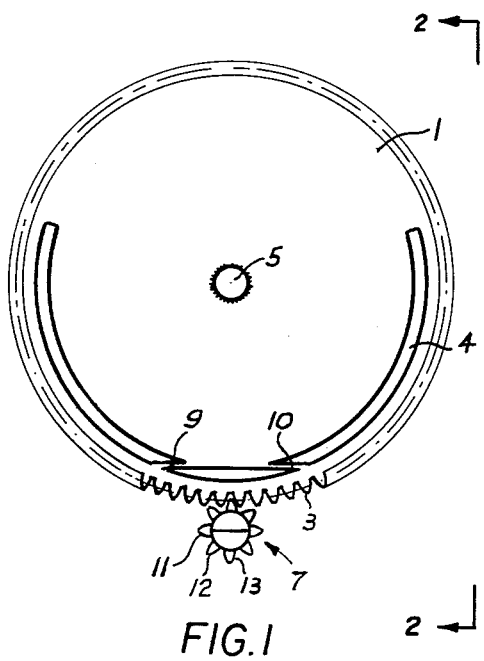
Figure 2:
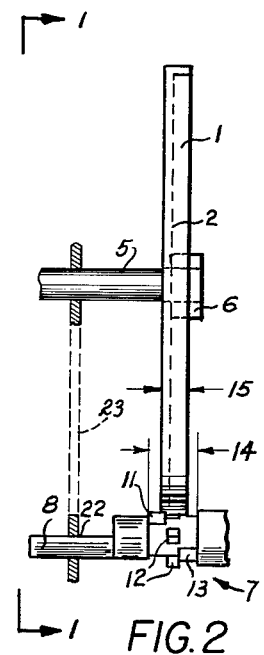

These and other objects of the invention will be more fully apparent from the drawings annexed herewith in which Figs. 1 and 2 in front and side elevations, respectively, shown an assembly of gears embodying certain principles of the invention.

In Figs. 1 and 2 a relatively large wheel for driving an element of a frequency modulation tuner is shown at 1 molded of plastic and having the profile indicated in Fig. 2 by dotted line 2.

Figure 3:
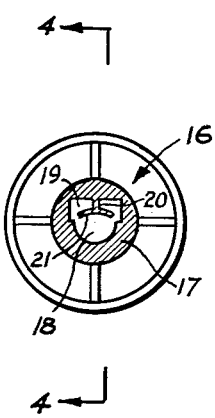
Figure 4:
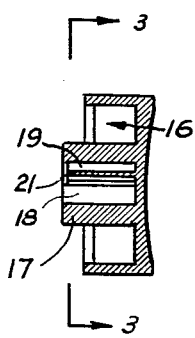

Figs. 3 and 4, also in front and side elevations, show part of Fig. 1 in enlarged views.

Wheel 1 has a number of peripheral teeth some of which are indicated at 3 extending over all or part of the periphery of wheel 1 as the case may be. Below the tooth base of teeth 3 there is a peripheral slot 4 extending over an angle slightly larger than 180°, in case that 180° or slightly less is the desired angle of rotation of wheel 1.

Wheel 1 is mounted on a shaft 5 by means of a hub 6 formed of one piece with wheel 1, shaft 5 being provided in the usual manner with longitudinal ridges or projections to assure positive connection between shaft 5 and hub 6. Shaft 5 is preferably inserted during the molding of wheel 1.

Wheel 1 is shown to engage with its teeth 3 a smaller wheel 7 provided with a shaft 8 which may serve in the frequency modulation tuner exemplified by this assembly to be manually operated, in a manner as will be explained further below.

Wheels 1 and 7 are mounted on their respective shafts 5, 8 in such a way relative to each other, as schematically indicated in Fig. 2 by chassis wall 23, that wheel 7 and wheel 1 will engage each other under predetermined pressure causing slot 4 to give away slightly.

In this way, continuous friction and a minimum of play is assured between the teeth of wheel 1 and those of wheel 7, thereby increasing accuracy of adjustment of the entire turning movement.

Slot 4 is arranged symmetrically to the point of engagement between tuner wheel 1 and manual wheel 7, and in order to better equalize the flexibility over the entire length of slot 4, the slot is interrupted by one or several ribs such as shown at 9, 10 which, in this embodiment of the arrangement and in the center position of the wheel 1 shown in Fig. 1, are arranged symmetrically with respect to the position of manual wheel 7.

In order further to enhance accuracy and increase the life of the assembly, and at the same time to simplify molding, the teeth of manual wheel 7 are arranged axially staggered with respect to each other such as indicated in Fig. 2 at 11, 12 and 13. In this way assurance against displacement in axial direction is enhanced and, at the same time, molding of the wheel and its teeth is facilitated. As apparent from Fig. 2 and as a preferred embodiment of the invention, these staggered teeth are so arranged as to cover an axial width 14, i.e. a width larger than the width 15 of wheel 1 and its teeth 3.

As another preferred feature, the outside teeth 11, 13 are slightly larger than the center teeth 12 of the staggered tooth arrangement 11, 12, 13 which extend alternatingly over the periphery of manual wheel 7.

To further insure driving action to be transferred in a positive manner from manual wheel 7 to tuning wheel 1 the wheel shaft 8 is made in otherwise well-known manner of a circular or slightly less than circular cross section and is provided with a knob also formed of plastic material and detachable therefrom and at the same time engaging shaft 8 in a positive and yet flexible manner without being exposed to excessive wear and tear.

As apparent from Figs. 3 and 4, a plastic knob 16 of otherwise well-known exterior is provided with a hub portion 17 containing a circular or slightly less than circular center bore 18 adapted to receive a corresponding semicircular or slightly more than semicircular shaft 8. In addition, in order to enhance gripping power of knob 16 on shaft 8, the semicircular bore 18 is shaped to extend into an approximately quadrangular cavity 19 from which projects, preferably made of one piece with hub 17, a radial or rib 20 extending into a flat pressure platelet 21 extending in a plane substantially coplanar with the flat portion 22 of shaft 8, and so positioned and dimensioned as to press flexibly against flat shaft portion 21 thereby assuring positive contact and engagement between knob 16 and shaft 8 when received in semicircular bore 18 of hub 17.

As apparent from Fig. 3, in order to facilitate mounting and enhance the flexibility of the pressure exerted by platelet 21 against the flat surface 22 of shaft 8, platelet 21 is shaped slightly curved as shown, concave with respect to surface 22, so that it may press against the surface 22 of shaft 8 when the latter is inserted into semicircular bore 18 of hub 17.

While the invention has been shown and described on hand of certain shapes and structures of wheels, of shafts and portions or parts engaging such wheels and shafts, and certain slots and cavities provided on these wheels and parts engaging such wheels, the invention is not limited to the specified particular element, element connections, or arrangements as illustrated but may be applied in any form or manner whatsoever without departing from the scope of this disclosure.

More specifically, the invention is not limited to wheels provided with teeth of any particular shape but may be applied to all types of teeth and also to wheel peripheries not provided with teeth but arranged to engage each other by friction or in any manner whatsoever, all this also without departing from the scope of this disclosure.

We claim:

1. In a driving mechanism for electronic devices, a number of tooth gears mounted together meshing with each other and including at least two gears with each other, one substantially larger than the other, said larger gear having a tooth base and along a section of said tooth base and extending substantially parallel thereto at least one longitudinal slot permitting said gears to be mounted together under flexible pressure.

2. Mechanism according to claim 1 wherein said slot extends over 180°.

3. Mechanism according to claim 1 wherein said slot extends over 180° interrupted by ribs which are perpendicular to a radial line from the axis of the large gear.

4. Mechanism according to claim 1 comprising several slots separated by ribs which are perpendicular to a radial line from the axis of the large gear insufficient substantially to affect the flexibility in radial direction caused by said slots.

5. Mechanism according to claim 1 wherein said other gear has teeth which are smaller in axial width than the teeth of said larger gear and which are peripherally staggered with respect to each other.

6. Mechanism according to claim 1 wherein said other gear has teeth which are of smaller axial width than the teeth of said larger gear and which are so staggered with respect to each other as together to extend contact substantially over the entire width of such larger gear.

7. Mechanism according to claim 1 wherein said other gear has teeth which are of smaller axial width than the teeth of the larger gear and which are so relatively staggered in groups of at least three teeth so that each group provides sequential contact substantially over the entire width of the larger gear.

8. In a driving mechanism for electronic devices, a number of wheels mounted together to peripherally engage each other and including at least one wheel having at least one slot extending near and along a portion of its periphery, and along said portion of its periphery engaging another of said wheels so as to permit said first wheel slightly to give away radially when mounted together with said other wheel.

9. Mechanism according to claim 8 wherein said wheels are adapted frictionally to engage each other peripherally.

10. Mechanism according to claim 8 wherein said wheels have peripheral teeth engaging each other, said slot being arranged along the tooth bases of at least one of said wheels.

11. Mechanism according to claim 10 wherein one of said wheels is substantially larger than the other; said slot being arranged in said larger wheel only.

12. Mechanism according to claim 8 wherein said wheels have teeth peripherally engaging each other; one of said wheels being substantially larger than the other and said slot being arranged in said larger wheel only; the smaller wheel having teeth arranged relatively staggered so as to be regularly distributed over a width at least corresponding to the tooth width of the larger wheel.

13. Mechanism according to claim 8 wherein said staggered teeth are distributed over a width substantially larger than the tooth width of the larger wheel.

14. Mechanism according to claim 8 wherein said slot is interrupted by at least one rib.

15. Mechanism according to claim 8 wherein said slot is interrupted by a pair of ribs arranged close to and on both sides of the midpoint of the slot symmetrically with respect to said midpoint and extending in a direction substantially tangential with respect to said midpoint.

16. Mechanism according to claim 15 wherein said slot extends over slightly more than 180°.

References Cited in the file of this patent

UNITED STATES PATENTS

| | | |
|---|---|---|
| 1,015,870 | Cadman | Jan. 30, 1912 |
| 2,207,290 | Hale | July 9, 1940 |
| 2,307,129 | Hines et al. | Jan. 5, 1943 |
| 2,335,504 | Gazda | Nov. 30, 1943 |
| 2,884,771 | Holt | May 5, 1959 |

FOREIGN PATENTS

| | | |
|---|---|---|
| 831,712 | France | Sept. 13, 1938 |